United States Patent
Saito et al.

(10) Patent No.: US 6,854,265 B2
(45) Date of Patent: Feb. 15, 2005

(54) EXHAUST GAS FILTER REGENERATING APPARATUS EFFECTIVELY BURNING PARTICULATE MATERIAL

(75) Inventors: Makoto Saito, Okazaki (JP); Shigeto Yahata, Kariya (JP); Masumi Kinugawa, Okazaki (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/337,895

(22) Filed: Jan. 8, 2003

(65) Prior Publication Data

US 2003/0131592 A1 Jul. 17, 2003

(30) Foreign Application Priority Data

Jan. 11, 2002 (JP) ........................................ 2002-005039

(51) Int. Cl.[7] ................................................ F01N 3/00
(52) U.S. Cl. ............................. 60/295; 60/274; 60/285; 60/286; 60/297; 55/DIG. 30
(58) Field of Search ........................ 60/285, 286, 274, 60/295, 297, 311, 276; 55/466, DIG. 30

(56) References Cited

U.S. PATENT DOCUMENTS

| | | | |
|---|---|---|---|
| 4,864,821 A | * | 9/1989 | Hoch ........................... 60/274 |
| 5,319,930 A | * | 6/1994 | Shinzawa et al. ............. 60/286 |
| 5,850,735 A | * | 12/1998 | Araki et al. .................. 60/274 |
| 5,974,791 A | * | 11/1999 | Hirota et al. ................. 60/276 |
| 6,405,528 B1 | * | 6/2002 | Christen et al. .............. 60/295 |
| 6,622,480 B2 | * | 9/2003 | Tashiro et al. ................ 60/295 |
| 2004/0000139 A1 | * | 1/2004 | Kawashima et al. .......... 60/295 |
| 2004/0031262 A1 | * | 2/2004 | Gui et al. ..................... 60/285 |
| 2004/0134187 A1 | * | 7/2004 | Inoue et al. .................. 60/291 |

* cited by examiner

*Primary Examiner*—Tu M. Nguyen
(74) *Attorney, Agent, or Firm*—Nixon & Vanderhye P.C.

(57) ABSTRACT

Particulate material collected in a filter (PM) is burnt through a selected one of partial and perfect regenerating processes. The partial regenerating process starts, when an amount of PM is predicted to exceed a value between 2 to 10 g/l, and terminates, when the amount of PM is predicted to fall below a value between 1 to 4 g/l, whereby a part of PM is burned to an extent that incombustible ash contained in the filter (ASH) can not easily pass through the filter. The perfect regenerating process starts, when an amount of ASH is predicted to exceed a value between 0.05 to 0.25 g/l, and terminates, when the amount of PM is predicted to fall below 1 g/l, whereby a substantially entire part of PM is burnt to an extent that ASH can easily pass through the filter.

19 Claims, 7 Drawing Sheets

EXHAUST GAS FILTER REGENERATING APPARATUS EFFECTIVELY BURNING PARTICULATE MATERIAL

CROSS REFERENCE TO RELATED APPLICATIONS

This application is based on and incorporates herein by reference Japanese Patent Application No. 2002-5039 filed on Jan. 11, 2002.

FIELD OF THE INVENTION

The present invention relates to an exhaust gas filter regenerating apparatus for a filter that collects particulate material in an exhaust gas of an internal combustion engine and method of the same, in which burning of the particulate material is effectively controlled by selecting partial and perfect regenerating processes.

BACKGROUND OF THE INVENTION

A diesel particulate filter (DPF) is known as a filter that collects particulate material (PM) of an exhaust gas. Regenerating methods of burning the PM for continuous use of the DPF utilize heating with a burner or electric heater, fuel supply to the DPF having an oxidation catalyst by injection control, or the like. In a conventional method, the PM is fully burned every time the PM is deposited by a preset amount. The PM deposited in the DPF includes an impurity mainly composed of $CaSO_4$ that is a combination of Ca in engine oil and S contained in diesel oil. The impurity, so-called ash, is generated in a combustion chamber of an internal combustion engine or within the filter by reaction between Ca and SOx through burning of the PM during the filter regenerating. A particulate diameter of the ash is between 0.1 $\mu$m to several $\mu$m and less than an average diameter 30 $\mu$m of filter pores. As the burnable parts of the PM is burned during the filter regeneration process, the filter pores stuffed with the PM as shown FIGS. 2A and 2B are opened as shown in FIG. 2C. The ash, which is incombustible, is thereby removed by passing through the filter pores with exhaust gas.

The regenerating method involves fuel consumption of the internal combustion engine through fuel supply to the filter, fuel supply to the burner, or fuel supply for generating electric power of the electric heater. Combustion speed of the PM has a tendency of decreasing with decrease of PM deposit amount. Combustion efficiency of the PM relative to the fuel consumption of the engine therefore decreases with the decrease of PM deposit amount during the regenerating process. In a conventional method, since the substantially entire amount of the PM deposited in the filter is burned every time once the PM deposit amount exceeds the preset amount, combustion efficiency on regenerating the filter is relatively low. This causes undesired increase of the fuel consumption in the regenerating method.

SUMMARY OF THE INVENTION

It is an object of the present invention to provide an exhaust gas filter regenerating apparatus that enables continuous use of a filter with less fuel consumption of an internal combustion engine.

To achieve the above object, regenerating a filter in a regenerating apparatus is executed as follows. Two parameters are detected. The first parameter has a value that is correlative with and predicts an amount of the collected particulate material. The second parameter has a value that is correlative with and predicts an amount of the incombustible impurity contained in the collected particulate material. Regenerating is executed by burning the collected particulate material and controlled by selectively performing either a partial or perfect process. In the partial regenerating process, a part of the collected particulate material is burnt to an extent that the impurity can not easily pass through the filter. In the perfect regenerating process, a substantially entire part of the collected particulate material is burnt to an extent that the impurity can easily pass through the filter. Here, the partial regenerating process starts when the value of the first parameter exceeds a first threshold and terminates when the value of the first parameter falls below a second threshold that is smaller than the first threshold. By contrast, the perfect regenerating process starts when the value of the second parameter meets a predetermined condition and terminates when the value of the first parameter falls below a third threshold that is smaller than the second threshold.

It is preferable that a value of the second threshold predicts that the collected particulate material remaining in the filter is an amount not less than 1 gram per liter of the filter and not more than 4 grams per liter of the filter.

It is preferable that a value of the third threshold predicts that the particulate material remaining in the filter is an amount not less than 0.05 gram per liter of the filter and not more than 0.25 grams per liter of the filter.

It is preferable that the second parameter is a cumulative driving mileage, a cumulative fuel injection amount, or a cumulative number of times of the partial regenerating processes. The cumulative driving mileage is reset at a time when the immediately previous perfect regenerating process terminates. The cumulative fuel injection amount is reset at a time when the immediately previous perfect regenerating process terminates. The cumulative number of times of the partial regenerating processes is reset at a time when the immediately previous perfect regenerating process terminates.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 3:
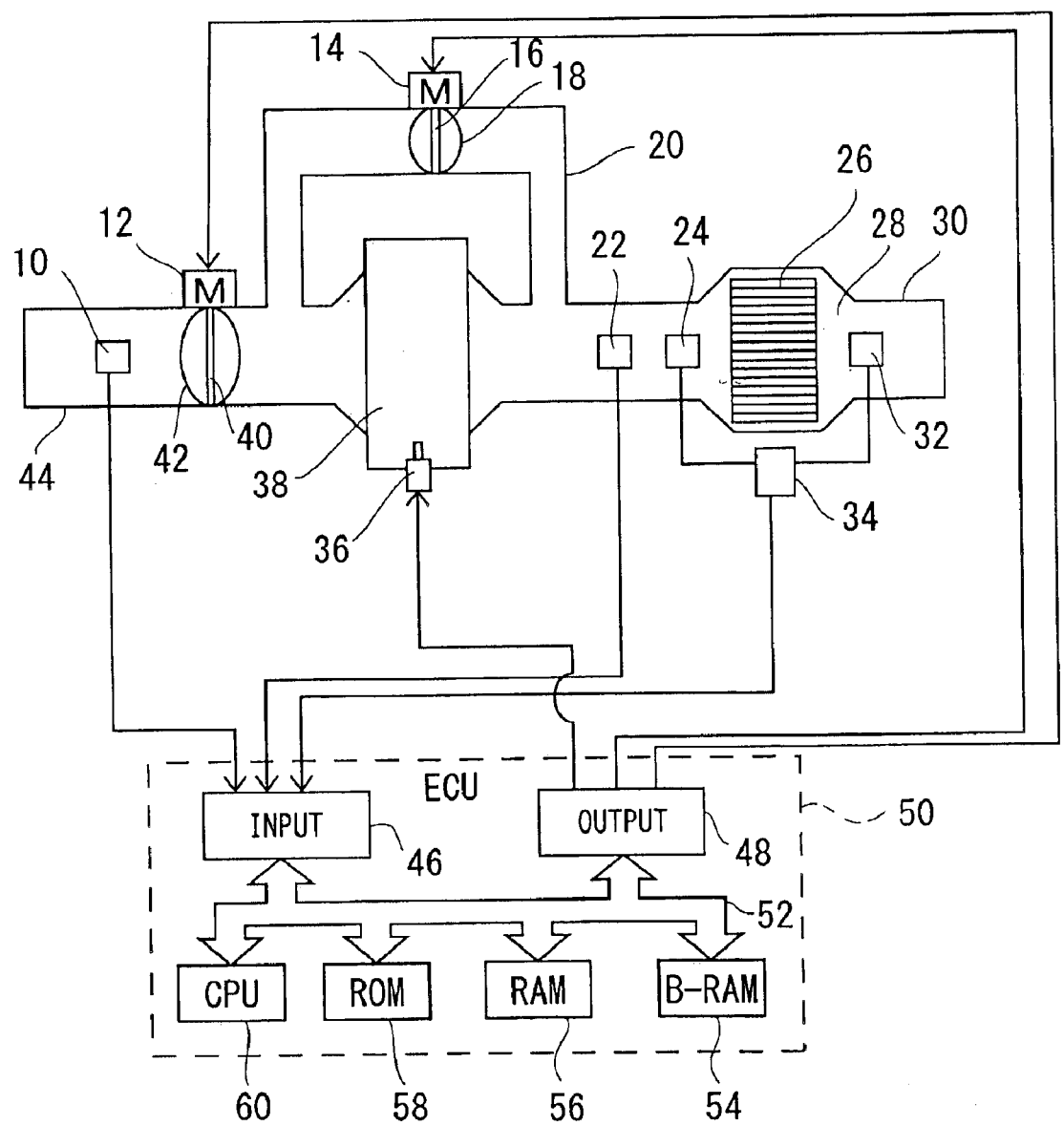
FIG. 3 is a schematic structural diagram of an exhaust gas filter regenerating apparatus according to the first embodiment.

A first embodiment is directed to a regenerating apparatus, shown in FIG. 3, for a diesel particulate filter (DPF) 26. Structure of the regenerating apparatus will be explained hereunder. The regenerating apparatus is mounted on a vehicle that is driven by a diesel engine 38. A suction pipe 44 is connected with a suction port (not shown) of the diesel engine 38. An airflow meter 10 for detecting a suction flow amount is installed within the suction pipe 44. A throttle valve 42 is installed on the downstream side of the airflow meter 10, while driven by an electric motor 12 through a rotation axis 40 for adjusting the suction flow amount.

An exhaust pipe 30 is connected with an exhaust port (not shown) of the diesel engine 38. The DPF 26, formed of porous ceramics and coated with oxidation catalytic agent, is installed within the exhaust pipe 30.

Detectors 24, 32 installed in the exhaust pipe 30 on both upstream and downstream sides of the DPF 26 are connected with a differential pressure sensor 34 for detecting differential pressure. A temperature sensor 22 is installed on the upstream side of the DPF 36 within the exhaust pipe 30.

The suction pipe 44 and exhaust pipe 30 communicate with each other through an exhaust gas recirculation (ERG) pipe 20. A part of the exhaust gas is thereby recirculated to the suction pipe 44. An ERG valve 18 is installed within the ERG pipe 20 while driven by an electric motor 14 through a rotating axis 16 for adjusting an ERG flow amount.

An electronic control unit (ECU) 50 is equipped with ROM 58 for storing a program for regenerating an exhaust gas filter, CPU 60 for executing the program, RAM 56 and back-up RAM (B-RAM) 54 for storing data while executing the program, an input circuit 46, and an output circuit 48. These components are connected with each other through a bus 52. The input circuit 46 is connected with the airflow meter 10, the temperature sensor 22, the differential pressure sensor 34 and other sensors while inputting respective signals to the CPU 60. The output circuit 48 is connected with the electric motor 12 for the throttle valve 42, the electric motor 14 for the ERG valve 18, the injector 36 and others while supplying driving electric current to these devices based on control signals outputted by the CPU 60.

The regenerating process of the regenerating apparatus will be explained hereunder. In the regenerating process, as main injection timing of the injector 36 is retarded in a combustion cycle, the fuel is injected to a cylinder from the injector 36 at a preset angular phase of a crank shaft (not shown) after the main injection. A part or all of the injected fuel after the main injection is exhausted, without being burned in the cylinder, into the exhaust pipe 30 to reach the DPF 26. The unburned fuel that reaches the DPF 26 reacts with the oxidation catalyst to burn together with the PM deposited in the DPF 26. The burned PM is exhausted downstream through the pore of the DPF 26 with the exhaust gas.

In the regenerating process, the unburned fuel that reaches the DPF 26 is also increased by decreasing the suction flow amount into the diesel engine 38. Specifically, the suction flow amount is decreased by controlling to lessen an opening degree of the throttle valve 42 while the exhaust gas recirculation amount is decreased by controlling to lessen an opening degree of the ERG valve 18.

Furthermore, in the regenerating process, heating with a burner or electric heater may be also adopted instead of the above fuel supply to the filter holding the oxidation catalyst. The temperature sensor 22 may be installed on the downstream side of the DPF 26 or a pair of the temperature sensors 22 may be installed on both upstream and downstream sides of the DPF 26 to accurately predict the temperature of the DPF 26.

Figure 1:
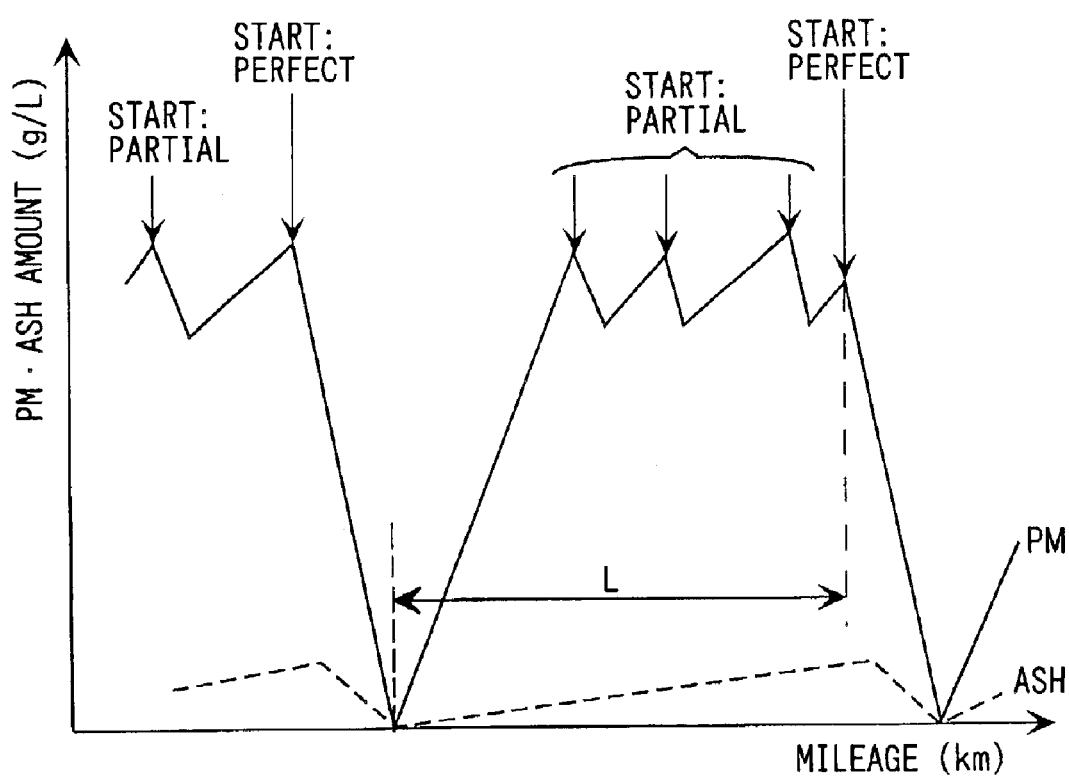
FIG. 1 is a graph showing partial and perfect regenerating process timing of diesel particulate filter (DPF) according to a first embodiment of the present invention.
Figure 2A:
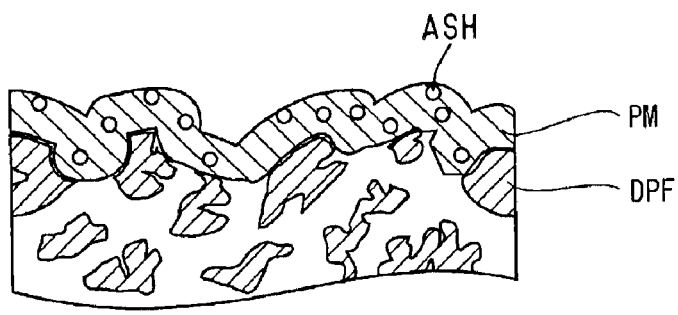
FIGS. 2A to 2C are schematic sectional views of particulate material (PM) deposited in the DPF according to the first embodiment.
Figure 2B:
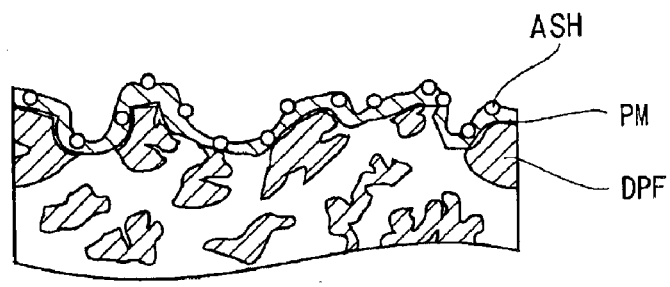
Figure 2C:
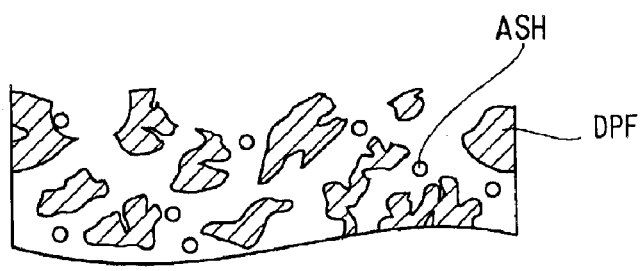

Referring to FIG. 1, partial and perfect regenerating processes will be explained below. The regenerating process is started when a PM deposit amount M per liter of the filter is assumed to exceed a threshold M1 or when an ash deposit amount A per liter of the filter is assumed to exceed a threshold A1.

The threshold M1 is desirably set to a value between 2 and 10 ($2 \leq M1 \leq 10$) grams per liter of the filter in consideration of combustion speed of the PM during the regenerating process as well as influence of fluid friction resistance on engine output due to the PM deposited in the DPF 26.

Figure 4:
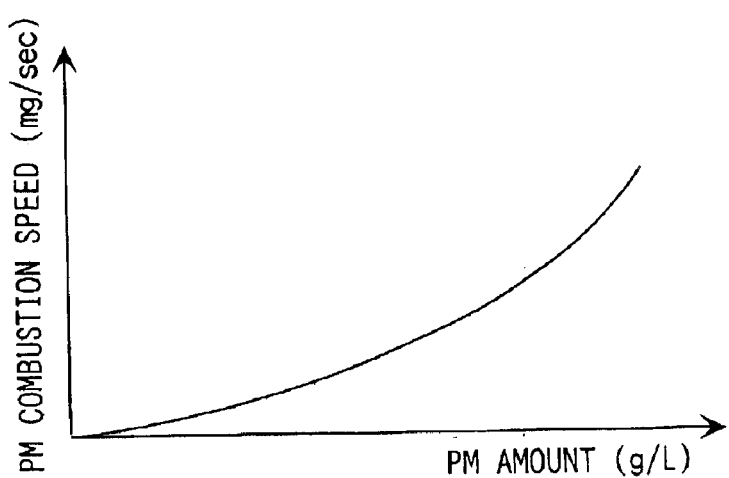
FIG. 4 is a graph showing relationship between a PM deposit amount and PM combustion speed according to the first embodiment.

If the threshold M1 is set to a higher value, the engine output is reduced due to the excessive fluid friction resistance. On the other hand, if the threshold M1 is set to a lower value, the combustion speed of the PM is decreased with decrease of PM deposit amount as shown in FIG. 4 so that the combustion efficiency of the PM is lowered.

The threshold A1 is desirably set to a value between 0.05 and 0.25 ($0.05 \leq A1 \leq 0.25$) gram per liter of the filter in consideration of fuel consumption for removing the PM almost perfectly from the DPF 26 as well as a contact area where a burnable part of the PM contacts the oxidation catalyst on the surface of the DPF 26.

If the threshold A1 is set to a lower value, the fuel consumption is excessively increased. On the other hand, if the threshold A1 is set to a higher value, the contact area is excessively decreased so that the combustion efficiency is worsened.

Even in adopting the heating of the burner or electric heater for the regenerating process instead of the above method utilizing the oxidation catalyst, the threshold A1 should not be set to an excessively higher value. When the threshold A1 is set to the higher value, the burnable ratio of the PM deposited in the DPF 26 is excessively decreased. Decrease of the burnable ratio results in increase of the fuel consumption.

The regenerating process that is started when a PM deposit amount M per liter of the filter is assumed to exceed a threshold M1 is terminated when the PM deposit amount M per liter of the filter is assumed to fall below a threshold M2. This regenerating process is defined as partial regenerating process. The threshold M2 is desirably set to a value between 1 and 4 grams per liter of the filter ($1 \leq M2 \leq 4$) to terminate the process before the burnable part of the PM is not entirely burned. If the threshold M2 is set to a lower value, the combustion efficiency of the PM is worsened due to the fuel consumption to be excessively increased as explained above. If the threshold M2 is set to a higher value, frequency of the regenerating process is increased. This also results in increase of frequency of heating the exhaust pipe and others in addition to the DPF 26. The fuel consumption thereby increases.

The regenerating process that is started when an ash deposit amount A per liter of the filter is assumed to exceed a threshold A1 is terminated when the PM deposit amount M per liter of the filter is assumed to decrease to a threshold M3 in which the ash can pass through the filter pores of the DPF 26. This regenerating process is defined as perfect regenerating process. The threshold M3 is desirably set to less than 1 ($M3<1$) gram per liter of the filter. Through the perfect regenerating process, the filter pores stuffed with the PM are opened so that the ash is almost entirely removed by passing through the filter pore with the exhaust gas.

Figure 5:
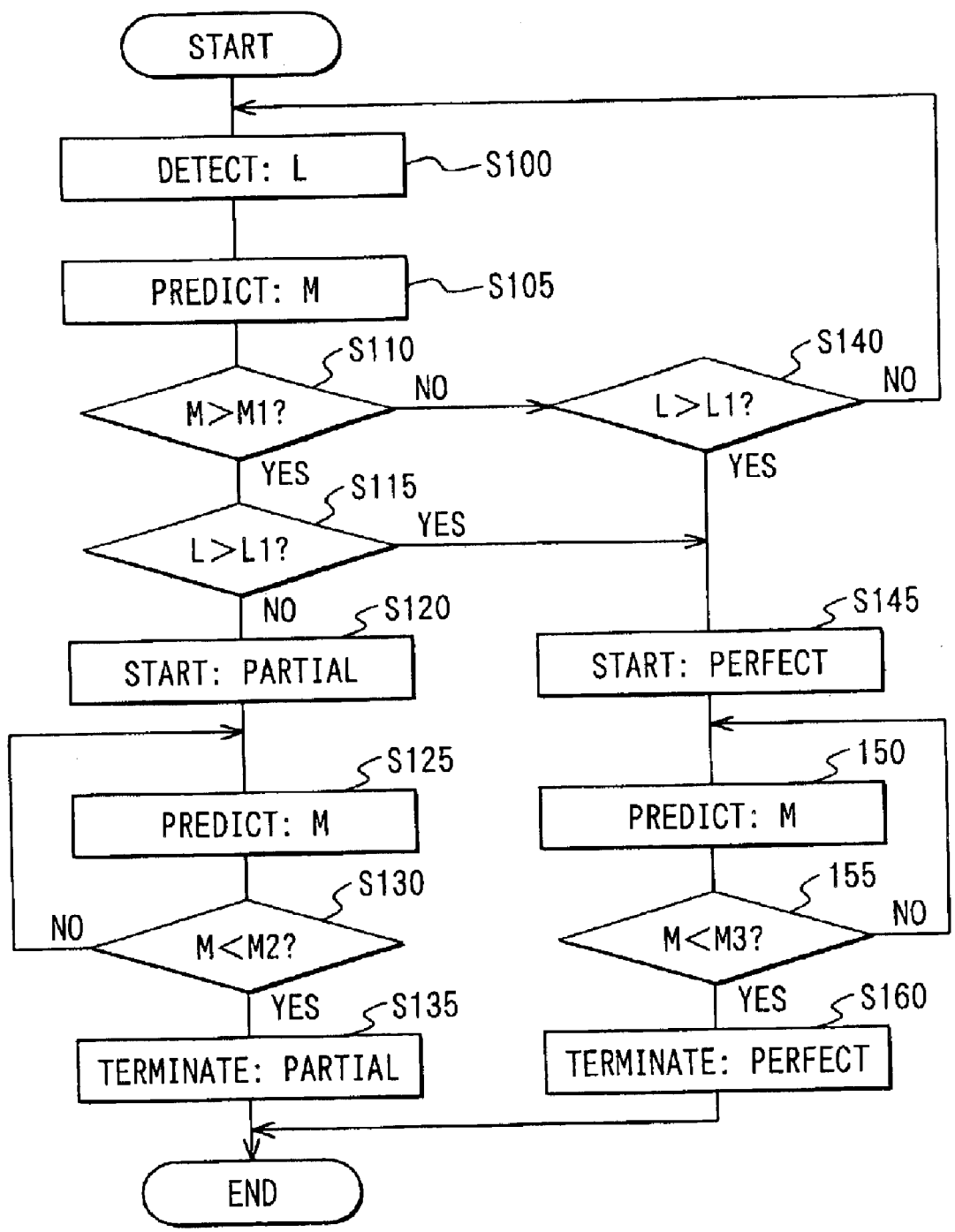
FIG. 5 is a flow diagram showing processing of exhaust gas filter regenerating process according to the first embodiment.

Referring to FIG. 5, processing routine of the regenerating process will be explained below. The routine is repeatedly executed every predetermined period. At step 100, cumulative driving mileage L after the previous perfect regenerating process is detected. The mileage L is detected by reading a counter, stored in the RAM 56, which is incremented according to the mileage and reset at the termination of the perfect regenerating process. The mileage L is used, as the second parameter (the first parameter is described later at step 105), for predicting the ash deposit amount A since the ash increases with mileage L. For instance, a threshold mileage L1 of 1000 km is assumed to correspond to the threshold A1, e.g., 0.085 g/l, of the ash deposit where the perfect regenerating process should be started.

At step 105, the PM deposit amount M is predicted by detecting, as the first parameter, exhaust temperature and pressure difference between the upstream and downstream sides of the DPF 26 through reading an exhaust temperature signal from the temperature sensor 22 and a pressure signal from the differential pressure sensor 34. The PM deposit amount M may be predicted based on cumulative mileage, a cumulative fuel injection amount, or a cumulative suction flow amount of the airflow meter 10.

At step 110, whether the PM deposit amount M exceeds the threshold M1 ($2 \leq M1 \leq 10$) is determined. Regardless of the determination at step 110, whether the mileage L exceeds the threshold L1 is determined at step 115 or step 140. When the PM deposit amount M exceeds the threshold M1 and the mileage L does not exceed the threshold L1, partial regenerating process starts at step 120. When the mileage L exceeds the threshold L1, the ash deposit amount A is assumed to exceed the threshold A1 so that perfect regenerating process starts at step 145 regardless of the determination whether the PM deposit amount M exceeds the threshold M1. When the PM deposit amount M and mileage L do not exceed the threshold M1 and L1 respectively, the processing returns to step 100 without any regenerating process. However, it may be differently programmed so that the perfect regenerating process can start, only when the PM deposit amount M exceeds the threshold M1 and the mileage L exceeds the threshold L1. This means that step 140 is eliminated. Here, the threshold L1 is set to, e.g., 1000 km corresponding to the threshold A1 of the ash deposit amount.

In each of the partial and perfect regenerating processes at steps 120 and 145, the regenerating process as already explained above is performed.

At each of steps 125 and 150, the PM deposit amount M during the regenerating process is predicted by the same processing explained at step 105 based on the detection of the exhaust temperature and differential pressure between upstream and downstream sides of the DPF 26. Each of the subsequent steps 130 and 155 is provided to determine the termination timing of the regenerating processes based on the PM deposit amount M predicted at step 125 or step 150. At step 130 or step 155, whether the PM deposit amount M exceeds the threshold M2 ($1 \leq M2 \leq 4$) or M3 ($M3<1$) is determined. When the PM deposit amount M does not exceed the threshold M2 or M3, the processing returns to step 125 or step 150. When the PM deposit amount M exceeds the threshold M2 or M3, the processing goes to step 135 or step 160 where the partial or perfect regenerating process is terminated.

Second Embodiment

Figure 6:
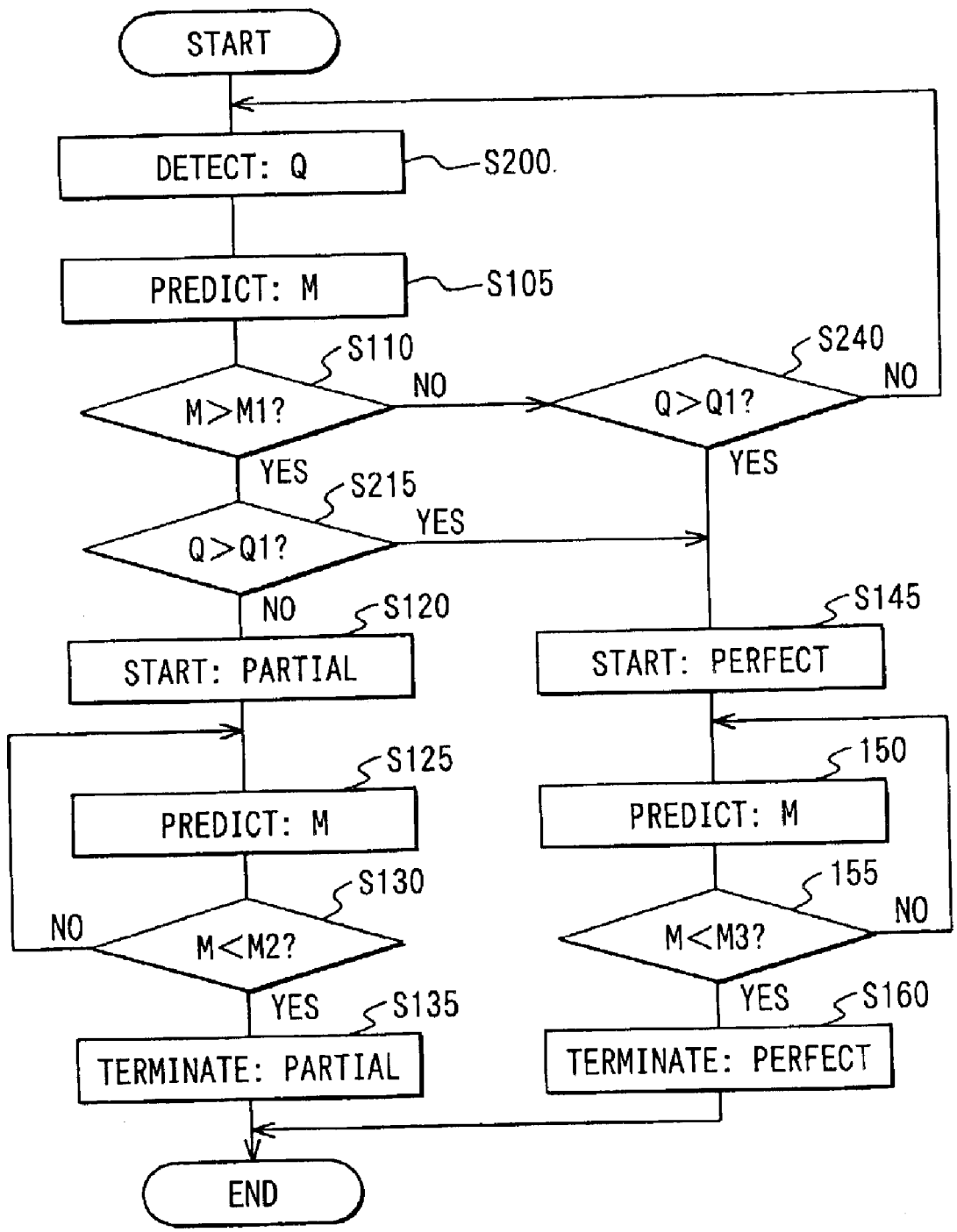
FIG. 6 is a flow diagram showing processing of exhaust gas filter regenerating process according to a second embodiment.

A second embodiment utilizes a fuel injection amount as the second parameter for predicting the ash deposit amount A, while the first embodiment utilizes the driving mileage L. Referring to FIG. 6, the processing of the regenerating process is the same as that of FIG. 5 of the first embodiment except for steps 200, 215 and 240.

At step 200, a cumulative fuel injection amount Q after the previous perfect regenerating process is detected. The fuel injection amount Q is detected by reading a counter, stored in the RAM 56, which is incremented according to the fuel injection amount and reset at the termination of the perfect regenerating process. The fuel injection amount Q is used, as the second parameter, for predicting the ash deposit amount A since the ash increases with fuel injection amount Q. For instance, a threshold amount Q1 of 60 liters is assumed to correspond to the threshold A1, e.g., 0.085 g/l, of the ash deposit where the perfect regenerating process should be started.

At steps 215 and 240, whether the fuel injection amount Q exceeds the threshold Q1 is determined. The other processing is the same as that of FIG. 5 of the first embodiment as explained above.

Third Embodiment

A third embodiment utilizes the number C of partial regenerating process times after the previous perfect regenerating process as the second parameter for predicting the ash deposit amount A, while the first embodiment utilizes the driving mileage L. The other processing of the regenerating process is the substantially same as that of the first embodiment.

Figure 7:
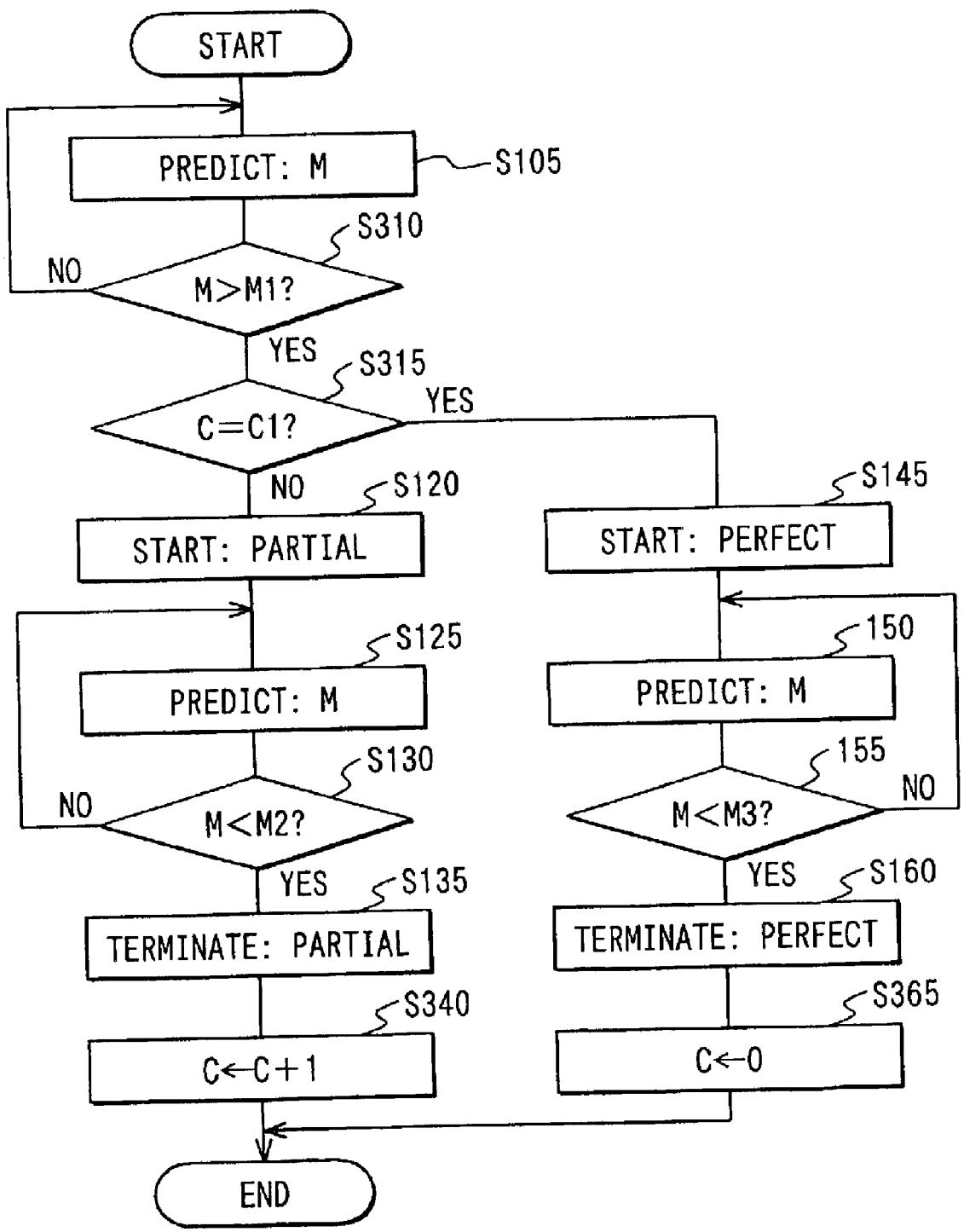
FIG. 7 is a flow diagram showing processing of exhaust gas filter regenerating process according to a third embodiment.

Referring to FIG. 7, at step 105, a PM deposit amount M is predicted. At step 310, whether the PM deposit amount M predicted at step 105 exceeds the threshold M1 is determined. When the PM deposit amount M does not exceed the threshold M1, the processing returns to step 105. When the PM deposit amount M exceeds the threshold M1, the processing proceeds to step 315 where whether the number C is equal to a threshold number C1 is determined.

When the number C is less than the threshold number C1, the partial regeneration process is started at step 120. After the partial regenerating process at steps 120, 125, 130, and 135, the number C is incremented by one at step 340.

When the number C is equal to the threshold number C1, the perfect regeneration process is started at step 145. After the perfect regenerating process at steps 145, 150, 155, and 160, the number C is reset to zero at step 365.

The number C of the partial regenerating process times is used, as the second parameter, for predicting the ash deposit amount A since the ash increases with number C. For instance, a threshold number C1 of 23 is assumed to correspond to the threshold A1, e.g., 0.085 g/l, of the ash deposit where the perfect regenerating process should be started.

Fourth Embodiment

Figure 8:
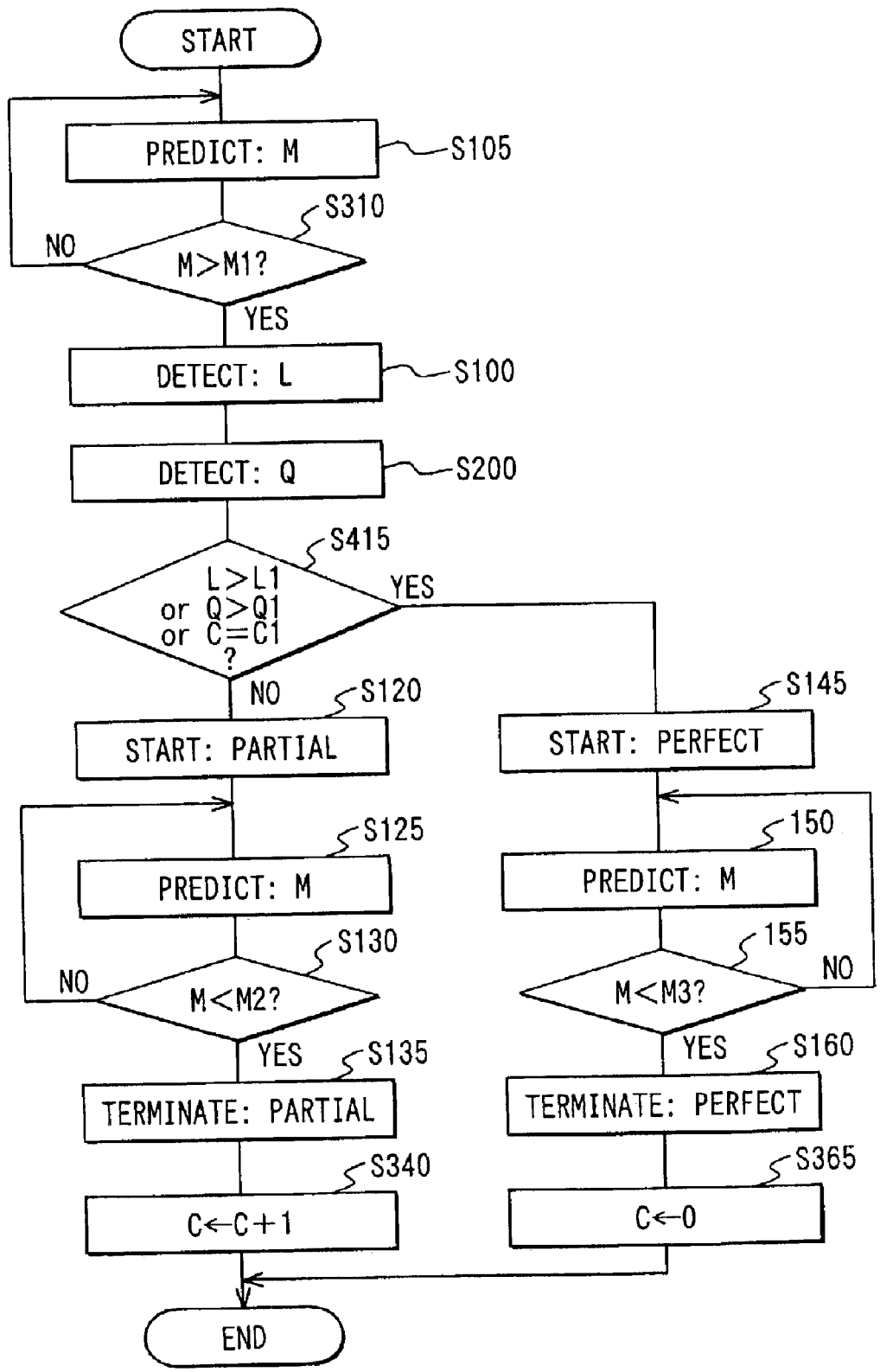
FIG. 8 is a flow diagram showing processing of exhaust gas filter regenerating process according to a fourth embodiment.

A fourth embodiment simultaneously utilizes, as the second parameter for predicting the ash deposit amount A, the driving mileage L, the fuel injection amount Q, and the number C of partial regenerating process times after the previous perfect regenerating process. Referring to FIG. 8, the perfect regenerating process is started based on determination at step 415. Namely, whether the parameter L exceeds its threshold value L1 whether the parameter Q exceeds its threshold value Q1, or whether the parameter C is equal to the threshold value C1 is determined. If at least one of the three determinations is affirmative, the processing proceeds to step 145 where the perfect regenerating process is started. By contrast, all of the three determinations are negative, the processing proceeds to step 120 where the partial regenerating process is started. Utilizing of the plurality of the second parameters enhances accuracy of predicting the ash deposit amount A and optimizes the timing of starting the perfect regenerating process.

Other Modification

After the iterative regenerating processes, an amount of the ash, the unburned part of the PM, remaining in the DPF 26 after the perfect regenerating process is gradually accumulated, while the burnable part of the PM is not accumulated. The differential pressure DP, after the perfect regenerating process, between the upstream and downstream sides of the DPF 26 is thereby correspondingly accumulated in comparison with the initial differential pressure $DP_0$ through a new filter. The differential pressure variation $\Delta P$ ($DP-DP_0$) can be used as the third parameter for predicting the ash deposit amount Ar remaining in the DPF 26 after the perfect regenerating process. Using the ash deposit amount Ar, unburned or burnable parts of the PM deposit amount M can be more accurately predicted, so that the threshold values such as M1, M2 and M3 are more properly adjusted.

What is claimed is:

1. A method for regenerating a filter provided in an exhaust pipe of an internal combustion engine, wherein particulate material is collected in the filter and incombustible impurity is contained in the collected particulate material, the method comprising steps of:

detecting a first parameter whose value is correlative with and detectable an amount of the collected particulate material;

detecting a second parameter whose value is correlative with and detectable of an amount of the incombustible impurity contained in the collected particulate material; and burning the collected particulate material through a partial regenerating process in which, unless the second parameter meets a predetermined condition, a burn of the collected particulate material starts, when the value of the first parameter exceeds a first threshold, and terminates, when the value of the first parameter falls below a second threshold that is smaller than the first threshold, whereby a part of the collected particulate material is burnt to an extent that the incombustible impurity can not easily pass through the filter.

2. A method according to claim 1, wherein a value of the second threshold predicts that the collected particulate material remaining in the filter is an amount less than 1 gram per liter of the filter and not more than 4 grams per liter of the filter.

3. A method according to claim 1, further, comprising steps of:

performing a perfect regenerating process in which a substantially entire part of the collected particulate material is burnt to an extent that the incombustible impurity can easily pass through the filter, wherein the perfect regenerating process starts when the value of the second parameter meets the predetermined condition and terminates when the value of the first parameter falls below a third threshold that is smaller than the second threshold.

4. A regenerating apparatus for a filter provided in an exhaust pipe of an internal combustion engine, wherein particulate material is collected in the filter and incombustible impurity is contained in the collected particulate material, comprising:

first detecting means for detecting a first parameter whose value is correlative with and predicts an amount of the collected particulate material;

second detecting means for detecting a second parameter whose value is correlative with and predicts an amount of incombustible impurity contained in the collected particulate material;

regenerating means for burning the collected particulate material;

control means for controlling the regenerating means to perform a partial regenerating process in which a part of the collected particulate material is burnt to an extent that the incombustible impurity can not easily pass through the filter, wherein the partial regenerating process starts when the value of the first parameter exceeds a first threshold and terminates when the value of the first parameter falls below a second threshold that is smaller than the first threshold, unless a value of the second parameter meets a predetermined condition.

5. A regenerating apparatus according to claim 4, wherein a value of the second threshold predicts that the collected particulate material remaining in the filter is an amount less than 1 gram per liter of the filter and not more than 4 grams per liter of the filter.

6. A regenerating apparatus according to claim 4, wherein the control means controls the regenerating means to perform a perfect regenerating process in which a substantially entire part of the collected particulate material is burnt to an extent that the impurity can easily pass through the filter, wherein the perfect regenerating process starts when the value of the second parameter meets a predetermined condition and terminates when the value of the first parameter falls below a third threshold that is smaller than the second threshold.

7. A method for regenerating a filter provided in an exhaust pipe of an internal combustion engine, wherein particulate material is collected in the filter and incombustible impurity is contained in the collected particulate material, the method comprising steps of:

detecting a first parameter whose value is correlative with and detectable an amount of the collected particulate material;

detecting a second parameter whose value is correlative with and detectable an amount of the incombustible impurity contained in the collected particulate material; and burning the collected particulate material through a selected one of first and second processes, the first process being a partial regenerating process in which a burn of the collected particulate material starts, when the value of the first parameter exceeds a first threshold, and terminates, when the value of the first parameter falls below a second threshold that is smaller than the first threshold, whereby a part of the collected particulate material is burned to an extent that the impurity can not easily pass through the filter and the second process is a prefect regenerating process in which the burn of the collected particulate material starts, when the value of the second parameter meets a predetermined condition, and terminates, when the value of the first parameter falls below a third threshold that is smaller than the second threshold, whereby a substantially entire part of the collected particulate material is burnt to an extent that the impurity can easily pass through the filter.

8. A method according to claim 7, wherein the filter includes a catalyst for facilitating burning of the particulate material and the regenerating means includes a throttle valve, an exhaust gas recirculation valve and an injector, further, comprising steps of:

executing at least one of first to third control, when the collected particulate material is burnt, wherein the filter includes a catalyst for facilitating burning of the particulate material, the first control being to retard start timing of main fuel injection of the injector in a combustion cycle from that at a time immediately before burning the collected particulate material, second control being to further inject fuel from the injector after finishing the main fuel injection in the combustion cycle, and third control being to lessen an opening degree of at least one of the throttle valve and the exhaust gas recirculation valve compared to that at a time immediately before burning the collected particulate material.

9. A method according to claim 7, wherein a value of the second threshold predicts that the collected particulate material remaining in the filter is an amount less than 1 gram per liter of the filter and not more than 4 grams per liter of the filter.

10. A method according to claim 7, wherein a value of the third threshold predicts that the particulate material remaining in the filter is an amount not less than 0.05 gram per liter of the filter and not more than 0.25 grams per liter of the filter.

11. A regenerating apparatus for a filter provided in an exhaust pipe of an internal combustion engine, wherein particulate material is collected in the filter and incombustible impurity is contained in the collected particulate material, comprising:

particulate detecting means for detecting a first parameter whose value is correlative with and predicts an amount of the collected particulate material;

impurity detecting means for detecting a second parameter whose value is correlative with and predicts an amount of the incombustible impurity contained in the collected particulate material;

regenerating means for burning the collected particulate material;

control means for controlling the regenerating means to selectively perform a partial regenerating process in which a part of the collected particulate material is burnt to an extent that the impurity can not easily pass through the filter, and a perfect regenerating process in which a substantially entire part of the collected particulate material is burnt to an extent that the impurity can easily pass through the filter, wherein the partial regenerating process starts when the value of the first parameter exceeds a first threshold and terminates when the value of the first parameter falls below a second threshold that is smaller than the first threshold and the perfect regenerating process starts when the value of the second parameter meets a predetermined condition and terminates when the value of the first parameter falls below a third threshold that is smaller than the second threshold.

12. A regenerating apparatus according to claim 11, wherein the filter includes a catalyst for facilitating burning of the particulate material and the regenerating means includes a throttle valve, an exhaust gas recirculation valve and an injector and, further, wherein, when the collected particulate material is burnt by the regenerating means, the control means executes at least one of first to third controls, the first control being to retard start timing of main fuel injection of the injector in a combustion cycle from that at a time immediately before burning the collected particulate material, second control being to further inject fuel from the injector after finishing the main fuel injection in the combustion cycle, and third control being to lessen an opening degree of at least one of the throttle valve and the exhaust gas recirculation valve compared to that at a time immediately before burning the collected particulate material.

13. A regenerating apparatus according to claim 11, wherein a value of the second threshold predicts that the collected particulate material remaining in the filter is an amount not less than 1 gram per liter of the filter and not more than 4 grams per liter of the filter.

14. A regenerating apparatus according to claim 11, wherein a value of the third threshold predicts that the particulate material remaining in the filter is an amount not less than 0.05 gram per liter of the filter and not more than 0.25 grams per liter of the filter.

15. A regenerating apparatus according to claim 11, wherein the second parameter is a cumulative driving mileage reset at a time when the immediately previous perfect regenerating process terminates.

16. A regenerating apparatus according to claim 11, wherein the second parameter is a cumulative fuel injection amount reset at a time when the immediately previous perfect regenerating process terminates.

17. A regenerating apparatus according to claim 11, wherein the second parameter is a cumulative number of times of the partial regenerating processes reset at a time when the immediately previous perfect regenerating process terminates.

18. A regenerating apparatus for a filter provided in an exhaust pipe of an internal combustion engine, wherein particulate material is collected in the filter, comprising:

first detecting means for detecting a first parameter whose value is correlative with and predicts an amount of the collected particulate material;

second detecting means for detecting a second parameter whose value is correlative with and predicts a factor other than the amount of the collected particle material;

regenerating means for burning the collected particulate material;

control means for controlling the regenerating means to perform a partial regenerating process in which a part of the collected particulate material is burnt to an extent that an impurity can not easily pass through the filter, wherein the partial regenerating process starts when the value of the first parameter exceeds a first threshold and terminates when the value of the first parameter falls below a second threshold that is smaller than the first threshold, unless a value of the second parameter meets a predetermined condition;

wherein incombustible impurity is contained in the collected particulate material, the value of the second parameter is correlative with and predicts an amount of the incombustible impurity contained in the collected particulate material, and the control means controls the regenerating means to perform a perfect regenerating process in which a substantially entire part of the collected particulate material is burnt to an extent that the impurity can easily pass through the filter, wherein the perfect regenerating process starts when the value of the second parameter meets a predetermined condition and terminates when the value of the first parameter falls below a third threshold that is smaller than the second threshold.

19. A regenerating apparatus for a filter provided in an exhaust pipe of an internal combustion engine, wherein particulate material is collected in the filter, comprising:

first detecting means for detecting a first parameter whose value is correlative with and predicts an amount of the collected particulate material;

second detecting means for detecting a second parameter whose value is correlative with and predicts a factor other than the amount of the collected particle material;

regenerating means for burning the collected particulate material;

control means for controlling the regenerating means to perform a partial regenerating process in which a part of the collected particulate material is burnt to an extent that an impurity can not easily pass through the filter, wherein the partial regenerating process starts when the value of the first parameter exceeds a first threshold and terminates when the value of the first parameter falls below a second threshold that is smaller than the first threshold, unless a value of the second parameter meets a predetermined condition;

wherein incombustible impurity is contained in the collected particulate material and the value of the second parameter is correlative with and predicts an amount of the incombustible impurity contained in the collected particulate material, further, comprising steps of:

performing a perfect regenerating process in which a substantially entire part of the collected particulate material is burnt to an extent that the impurity can easily pass through the filter, wherein the perfect regenerating process starts when the value of the second parameter meets the predetermined condition and terminates when the value of the first parameter falls below a third threshold that is smaller than the second threshold.

* * * * *